United States Patent [19]

Mithoff

[11] 4,085,317

[45] Apr. 18, 1978

[54] MOTORCYCLE SAFETY LIGHT

[76] Inventor: Oliver M. Mithoff, 3701 Bissonet Dr., Metairie, La. 70003

[21] Appl. No.: 734,890

[22] Filed: Oct. 22, 1976

[51] Int. Cl.[2] .................................... B62J 5/00

[52] U.S. Cl. .................................... 362/72; 340/134; 362/430

[58] Field of Search ..................... 240/7.55, 8.1 A, 58, 240/84; 340/93, 134; 224/29, 32 R, 39, 30 R

[56] References Cited

U.S. PATENT DOCUMENTS

| | | | |
|---|---|---|---|
| 2,704,839 | 3/1955 | Sweet | 240/8.1 A |
| 3,696,334 | 10/1972 | Demeter | 240/7.55 |
| 3,748,465 | 7/1973 | Murray et al. | 240/84 |
| 3,794,826 | 2/1974 | Jablonski | 240/84 |
| 3,862,410 | 1/1975 | Maxwell | 240/7.55 |
| 3,916,377 | 12/1975 | Demeter | 340/93 |

FOREIGN PATENT DOCUMENTS

| | | | |
|---|---|---|---|
| 817,019 | 5/1937 | France | 224/32 R |
| 1,102,847 | 10/1955 | France | 224/39 |
| 425,531 | 3/1935 | United Kingdom | 224/32 R |

*Primary Examiner*—L. T. Hix
*Assistant Examiner*—Alan Mathews
*Attorney, Agent, or Firm*—Keary & Garvey

[57] ABSTRACT

The present invention provides a safety light which can be mounted on a conventional motorcycle at an elevation where it can be easily seen by motorists and pedestrians. The device is comprised of an elevated elliptical lighted globe rigidly supported by a plurality of structural columns which attach to an adjustable sub-frame. The sub-frame, after proper adjustments are made, can be attached to virtually any type of conventional motorcycle, motorbike, bicycle or the like.

The globe portion of the present invention can be of a semi-transparent, but brightly colored material, having a hollow inner portion which allows the mounting of lighting fixtures on the inner portion, thereby providing a brilliant glow to the globe. The globe can be provided with inspection plates giving easy access to the interior portion of the globe so that repairs or adjustments can be made.

8 Claims, 3 Drawing Figures

MOTORCYCLE SAFETY LIGHT

BACKGROUND OF THE INVENTION

1. Field of the Invention

The present invention relates to motor vehicle safety devices, and more particularly relates to a safety device for motorcycles and the like, where a preferably elliptical lighted globe is supported by an adjustable frame on a motorcycle in an elevated position above the motorcycle.

2. General Background and Prior Art

With an increase in the cost of energy, particularly in fuels necessary for transportation, more and more people are looking for the cheapest form of transportation available. Thus, an enormous increase in the past few years has been seen in the number of persons utilizing smaller vehicles for transportation, which vehicles use a minimal amount of fuel. A larger and larger segment of the public is specifically turning to motorcycles and like small wheeled vehicles for transportation which are economical, but none the less not as safe as a full size conventional automobile.

Several types of safety systems such as turn signals, reflectors, brightly colored paint and other means have been used to draw attention to a motorcycle rider and thus increase his chance for having a safe and accident free journey. Other safey equipment has been utilized by motorcyclists, such as roll bars, helmets, farings, windshields, and the like. These latter devices unfortunately offer minimal protection after a motorcyclist has already been hit by a larger vehicle such as an automobile due to the failure of the motorist to recognize the motorcycle in time. It is to this problem that the present invention is directed.

The failure of motorists in automobiles to easily see and recognize a motorcyclist is a common problem. Often the driver is unable to see the motorcyclist along a roadway that has other vehicles parked in an adjacent lane or parking area. In such a situation, the only portion of the motorcyclist which may be spotted by the motorist is possibly the top portion of his head. In this situation, one can readily see that reflectors, turn signals, brake lights, and the like mounted low on the motorcycle are of little use when blocked by parked rows of conventional sized automobiles, shrubs, or similar obstructions. It is a common occurrance for a motorist in an automobile to pull out onto a highway where other vehicles may be parked blocking view, failing to see an oncoming motorcyclist with the result being a fatal or crippling accident.

GENERAL DISCUSSION OF THE PRESENT INVENTION

The present invention provides an elevated elliptical light globe, rigidly mounted and fixed to at least one elongated vertical support column. The columns are rigidly afixed to a structural and adjustable sub-frame which can be fitted to virtually and conventional motorcycle at the rear portion thereof. The sub-frame is comprised of a plurality intersecting braces and struts of tubular having adjustment holes drilled therein at convenient intervals where the connections are to be made. Thus, the interconnections of the sub-frame can be made at different locations as needed to adjust the frame to fit the desired motorcycle or like vehicle.

The elevated elliptical globe is provided with at least one inspection plate for easy access to the inner portion of the globe. The globe can be provided with inner lighting fixtures for giving it a glowing appearance. Any one of several safety colors can be given to the globe.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Structure

Figure 1:
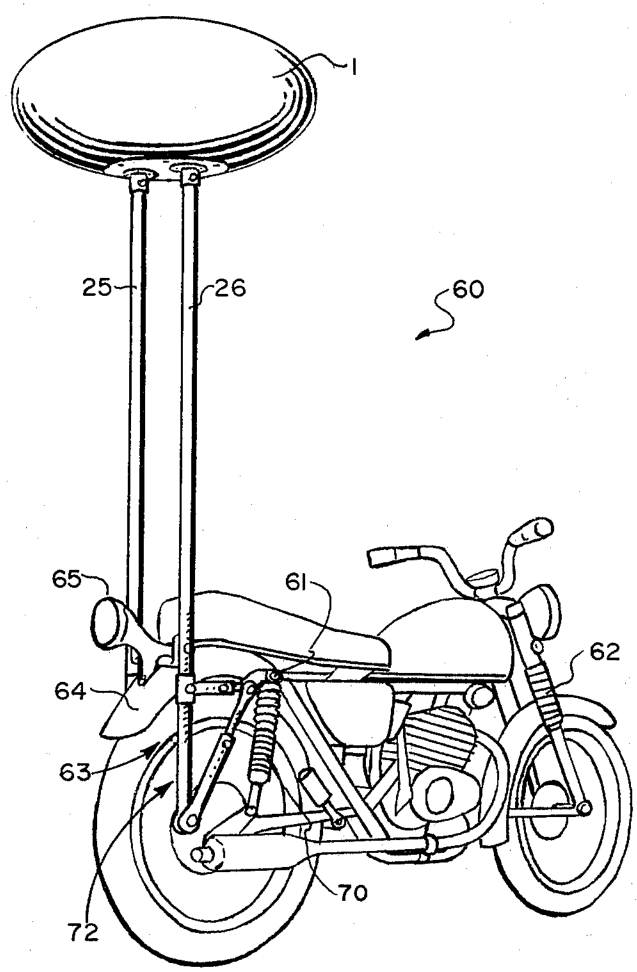
FIG. 1 is a perspective view of the preferred embodiment of the present invention mounted on a conventional motorcycle.

FIG. 1 illustrates the preferred embodiment of the apparatus of the prsent invention, designated generally by the numeral 60, mounted on a conventional motorcycle 62. The apparatus of the present invention 60 is comprised generally of an elliptical globe 1 mounted on a plurality of structural columns 25 26 which columns are supported by a structural sub-frame 63.

Globe 1 is preferably an elliptical form having an exemplary diameter of 22–24 inches and an exemplary height of 12 inches. Globe 1 can be constructed of any semi-transparent material such as a glass, plastic or like construction, and in the preferred embodiment is of an orange color such as a day glow type orange, or a like safety color. Globe 1 can have a thickness, for example, of 3/16 or ¼ inch, and can be provided with inspection plates 2, 12 which are preferably circular and mounted at the upper and lower portions of globe 1 respectively.

Figure 2:
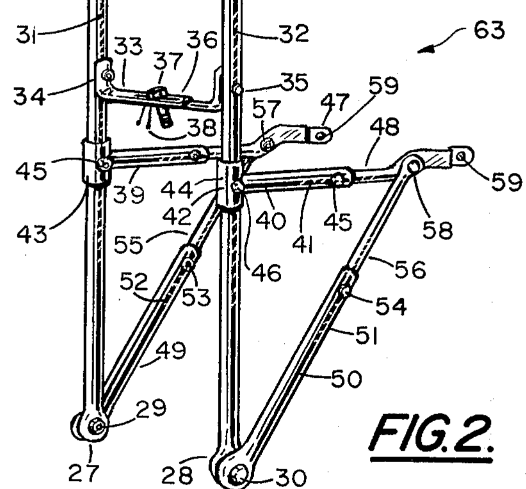
FIG. 2 is a perspective view of the preferred embodiment of the present invention.

In the preferred embodiment, a pair of columns 25, 26 support globe 1 by means of a plurality of sleeves 6, 7, 14, 15 which are rigidly afixed to upper and lower inspection plates 2, 12. Sleeves 6, 7, 14, 15 are preferably bolted to inspection plates 2, 12 as can best be seen in FIG. 2. The central portion of each sleeve 6, 7, 14, 15 is substantially the same inside diameter as the outside diameter of columns 25, 26. Each column is thus attached to its respective sleeve by means of an anchor bolt which is mounted through the respective sleeve and column through a common hole. In FIG. 2, anchor bolts are designated by the numerals 11, 22. In order that the distance between columns 25, 26 can be adjusted and thereby easily adapt to fit different width motorcycles, slots 18, 19, can be provided in lower inspection plate 12. Additionally, separate spaced sets 8, 9, 16, 17 of pre-drilled anchoring hole can be provided in inspection plates 2, 12 so that sleeves 6, 7, 14, 15 can be adjusted as needed to vary the distance between the columns 25, 26, and mount the columns rigidly with globe 1. Globe 1 is rigidly afixed to inspection plates 2, 12 using a plurality of, for example, bolts 4, 21.

Globe 1 is provided with inner lighting fixtures designated by the numerals 5, 13 in FIG. 2. Each lighting fixture is equipped with an electrical cable 3 which is fed through columns 25, 26 and out of the bottom portion of columns 25, 26 near the tail light portion 65 of the motorcycle 62, for electrical attachment thereto. Light bulbs 23, 24 can be any type of small 6 or 12 volt electrical light bulb such as is utilized for the tail light on a motorcycle, motorbike or automobile.

Sub-frame 63 is comprised generally of horizontal support members 39, 40, 47, 48 and diagonal support struts 49, 50, 55, 56. Struts 49, 50 diagonally connect to columns 25, 26 at the lower portion thereof. At the intersection of columns 25, 26 with struts 49, 50 the connections are made with conventional bolts 29, 30. The end portions 27, 28 of columns 25, 26 can be flattened as can be the end portions of struts 49, 50 thus forming a cooperating fit at the connections. Extension strut members 55, 56 are telescopically mounted in strut members 49, 50 respectively. A plurality of bolt holes 51, 52 is provided in each of the diagonal strut members respectively providing adjustability of strut members 55, 56 within strut members 49, 50. Any adjustment desired can be made by inserting bolts 53, 54 through pairs of aligned holes through the respective struts. (See FIG. 3)

Likewise, horizontal members 39, 40 are provided with inner telescopic braces 47, 48 which are similarly adjustable by use of holes 41, 42 and locking bolts 57, 58. Horizontal braces 47, 48 are attached at diagonal intersection 57, 58 to strut members 55, 56 using conventional bolts. The opposite end portions of braces 47, 48 from bolted adjustment connections 57, 58 are provided with mounting holes 59 which can be rigidly mounted to the upper bolted connections of the rear shock absorbers on a conventional motorcycle, designated by the numeral 61 in FIG. 1. The end portion of braces 47, 48 nearest holes 59 can be bent as necessary to avoid the upper portion of the shock absorber of the motor cycle. In the preferred embodiment, these end portions are flattened and bent upwards at approximately 25°, so as to avoid the top of the shock absorber. The end portions of braces 39, 40 which are fartherest from that part of the sub-frame which mounts to shock absorber bolts 61 is provided with a pair of sleeves 43, 44 which are alideably attachable to columns 25, 26 at a point which is substantially horizontal with the point of attachment of holes 59 to shock absorber bolts 61. A plurality of adjustment holes 31, 32 is provided in columns 25, 26 at these points respectively. Sleeves 43, 44 can be adjustably affixed to columns 25, 26 using conventional carriage bolts or the like designated by the numerals 45, 46 in FIG. 3.

Figure 3:
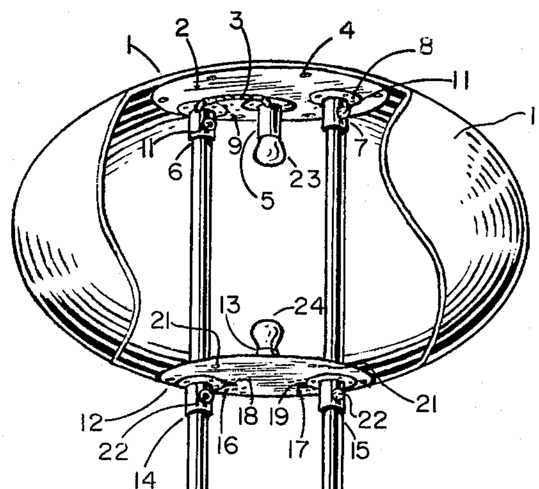
FIG. 3 is a partial perspective view of the sub-frame of the preferred embodiment of the apparatus of the present invention.
Figure 3:
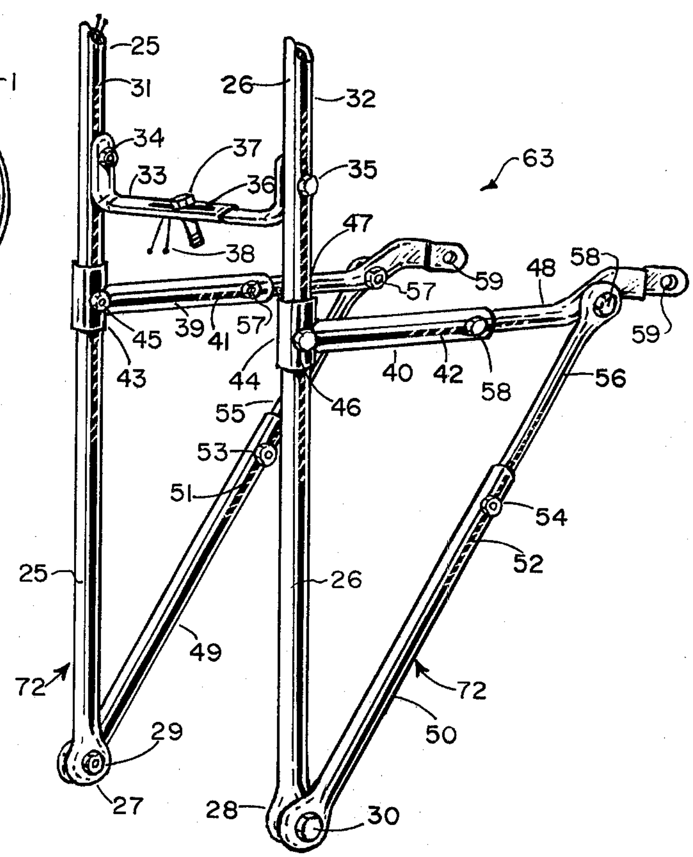

Thus, the connections described above between the respective members forms a pair of lower triangular braced sections 72 in the sub-frame 63 as can best be seen in FIG. 3. An adjustable sliding holding holding brace 33 is bolted for example, to each column 25, 26 at its respective end portions (See FIGS. 1 and 3). Brace 33 is comprised of a pair of L shaped members each having a central slot 36 through which a common anchor bolt 37 can be mounted. Brace 33 is attached at its respective end portions using anchor bolts 34, 35 as can best be seen in FIG. 1. Thus, the lower portion of sub-frame 63 can be adjusted as to width using bracket 33, and corresponding width adjustments as discussed above can be made at the connection of columns 25, 26 to globe 1. Anchor bolt 37, can permanently attach sub-frame 63 at brace 33 to the motorcycle fender 64 or tail light assembly 65. Each side 36 of the sliding brace 33 will be permanently bent upwards and curved inward to fit flush against columns 25, 26. In the preferred embodiment, each section of sliding brace 33 will have a central slot portion 36 which is approximately 3/16 inch wide by approximately 6 inches long.

Operation

The apparatus of the present invention 60 can be adjusted as needed to fit virtually any conventional motorcycle, motorbike, scooter or the like. The sub-frame portion 63 is attachable to a conventional motorcycle, and the rear shock absorber, its frame portion, fender or the like. In the preferred embodiment as is shown in FIG. 1, each triangular side portion 72 of the frame bolts to the upper mounting bolts 61 of the rear shock absorber 70. The other point of connection of the sub-frame 63 can be at the intersection of tail light 65 and fender 64. At this point, brace 33 can be bolted to either the tail light assembly 65 or the rear fender 64 using mounting bolt 37, welding, or like means.

As mentioned above, width adjustment of the frame substructure 63 and the columns 25, 26 at inspection plates 2, 12 is easily made utilizing the separate mounting holes and slots as more fully described above. Individual strut members or brace members can be extended or contracted as needed and the respective connection bolts 53, 54, 57, 58 attached to form a rigid one piece member. In the preferred embodiment, adjustment holes as noted more fully above are provided on each structural member to provide a wide span of adjustments to allow the substructure to be fitted to virtually any motorcycle, motorbike or like frame.

Because many varying and different embodiments may be taught within the scope of the inventive concept taught herein, and because many modifications may be made in the embodiments herein detailed in accordance with the descriptive requirements of law, it to be understood that the details herein are to be interpreted as illustrative and not in a limiting sense.

What is claimed as invention is:

1. A safety light and associated support for motorcycles, comprising:

a. a pair of adjustable, structural sub-frames rigidly attachable to the rear frame portion of a conventional motorcycle, each of said sub-frames being attachable to the side rear portion of said motorcycle, the attachment of said sub-frames to said motorcycle being connected at least partially to the rear axle and the rear shock absorber of said motorcycle;

b. a pair of columns, rigidly supported in a substantially verticle position by said sub-frames, each of said columns being associated with and supported by each of said respective sub-frames; and c. a spherical, lighted globe, rigidly affixable to said pair of columns in an elevated poisition above said frame.

2. The apparatus of claim 1, wherein said pair of adjustable structural sub-frames is comprised of:

a. a pair of triangularly shaped adjustable structural sub-frames, each sub-frame comprising a diagonal adjustable telescopic strut, and a horizontally mounted adjustable telescopic brace, said brace and said strut rigidly afixable together at their one of their respective end portions, said brace and said strut rigidly adjustably affixable at their opposite end portions to a lower portion of said column means; and b. a horizontally attachable adjustable brace, said attachable brace adjustably attached at its end portions to said column means, said attachable brace provided with bolt means on said attachable brace for rigidly attaching said attachable brace to a portion of the conventional motorcycle.

3. A safety light and associated support for motorcycles comprising:

a. column means b. an adjustable structural frame rigidly attachable to the rear portion of a conventional motorcycle, said frame comprising:

i. a pair of triangularly shaped adjustable sub-frames, each sub-frame comprising a diagonal adjustable telescopic strut, and a horizontally mounted adjustable telescopic brace, said brace and said strut rigidly affixable together at one of their respective end portions, said brace and said strut rigidly adjustable affixable at their opposite end portions to a lower portion of said column means; and ii. a horizontally attachable adjustable brace, said attachable brace adjustably attached at its end portions to said column means, said attachable brace provided with bolt means on said attachable brace for rigidly attaching said attachable brace to a portion of the conventional motorcycle;

said column means being rigidly supported in a substantially vertical position by said frame; and c. a spherical globe, rigidly affixable to said column means in an elevated position above said frame.

4. The apparatus of claim 3, wherein said globe is brightly colored.

5. The apparatus of claim 3, wherein said globe is a brightly colored sphere and said globe has a hollow inner portion with electrical light bulbs mounted on the inner portion, said light bulbs being provided with a source of electrical current capable of lighting said bulbs within said globe.

6. The apparatus of claim 3, wherein said column means is at least two substantially vertical, elongated, cylindrical, tubular support rods.

7. The apparatus of claim 3, wherein said globe is a day-glow orange color.

8. The apparatus of claim 3, wherein said globe is mounted on said column means at a distance of between one and ten feet above the seat portion of a conventional motorcycle to which said structural frame is attached.

* * * * *